July 26, 1927.

J. B. PAGIN 1,636,832

FISHING BAIT

Filed Oct. 30, 1925

Inventor
John B. Pagin
By George J. Utsch
Attorney

Patented July 26, 1927.

1,636,832

UNITED STATES PATENT OFFICE.

JOHN B. PAGIN, OF SOUTH BEND, INDIANA, ASSIGNOR TO SOUTH BEND BAIT CO., OF SOUTH BEND, INDIANA.

FISHING BAIT.

Application filed October 30, 1925. Serial No. 65,872.

The invention relates to fish bait, and has for its object to provide the forward end of the bait with a weight, which weight has combined therewith an angular disposed concaved surface, which causes the bait body to wobble as it dives. and the weighted head causes the weight body to dive sharply and deeply incident to the weight and resistance of the water against the concaved surface until the line attached to the bait, adjacent its forward end is substantially perpendicular.

A further object is to provide the forward end of the bait body with a combined weight and concave, and which weight is sufficiently heavy to overbalance the bait as a whole, and cause the bait to dive sharply and deeply during the reeling in of the fish line attached to the bait body adjacent the weighted head.

A further object is to provide a bait body with a weight at its forward end, which weight conforms to the contour of the bait body, and is provided with an angularly concaved surface for causing the bait to wobble and dive, said weight head being formed from a single piece of metal.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
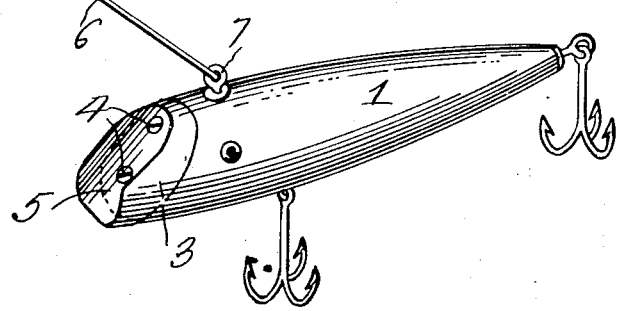
Figure 1 is a perspective view of the bait.
Figure 2:
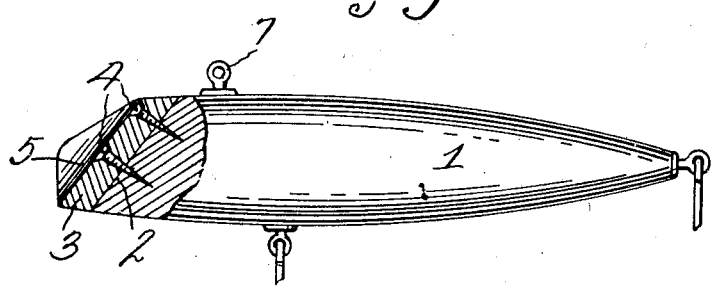
Figure 2 is a side elevation of the bait, showing part broken away to better show the structure.
Figure 3:
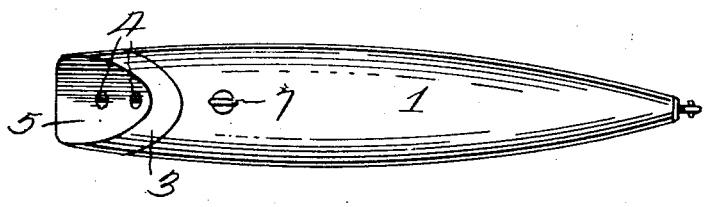
Figure 3 is a top plan view of the bait.

Referring to the drawing, the numeral 1 designates the body of the bait, the forward end of which is inclined downwardly and forwardly as at 2. Secured to the forward end of the bait body is a weighted head 3, through which screws 4 extend into the body 1 for securely holding the head 3 on the bait body. The weighted head 3 is provided with a downwardly and forwardly inclined concaved surface 5, which surface as the bait is drawn through the water causes the bait body to wobble and dive, however by providing the weighted head 3 the bait body is caused to dive sharply and deeply as the line 6 is reeled in, and the diving operation continues until the line 1 is substantially perpendicular to the line of movement of the bait body, and at which time the bait is relatively deep in the water. Bait bodies heretofore constructed have been provided with concaves 5, but the concaves have not been carried by a weighted head so that their combined action causes the bait to dive deeply, which is a decided advantage in many kinds of casting, and the device is primarily designed for a deep diving wobbling bait. In baits heretofore constructed weights have been used in the bait bodies, and some of which are of an adjustable nature, however where they are used, they involve a great deal of structure which materially increases the cost of manufacture, while in the present construction the wobbling concave 5 is formed on the head 3, and the whole head formed from a single piece of metal which may be cast to form, therefore it will be seen that the weight feature, not only cooperates with the concave during the diving operation for causing deep diving and simultaneous wobbling, but the bait may be cheaply manufactured and sold. The line 6 is connected to an eye 7 on the upper side of the bait body rearwardly of the weight head 3, and as the weight head is sufficiently heavy whereby the greater weight will be forwardly of the eye 7 whereby the resistance of the water plus the weighted head will cause the body to tilt sharply and dive deeply and continue to dive deeply until the reeled in line is nearly perpendicular to the travel of the bait.

From the above it will be seen that a weighted head is provided for a bait body, which head is formed from a single piece of metal and is provided with a concave, and the weighted head in combination with the concave will cause the bait to dive deeply and simultaneously wobble, and all of the advantages of a weighted bait body, and concave wobbling, diving surface 5, are provided in a single unit, thereby allowing the bait to be cheaply manufactured and sold.

The invention having been set forth what is claimed as new and useful is:—

1. The combination with the forward end of a bait body, of a weight head carried thereby, said head being provided with an angling concave surface and its edge terminating coincident with the adjacent edge of the body.

2. The combination with a bait body, a line attached to said bait body adjacent its forward end, of a weight head carried by said body, said weight head being provided with an angling concave surface and its edge terminating coincident with the adjacent edge of the body, said weight head in combination with the angling concave surface upon a pull upon the line cooperating for simultaneously causing the bait to tilt sharply and dive deeply and simultaneously wobble.

3. The combination with a fishing bait body, a line attached to said body at its upper side adjacent its forward end, of a weight head carried by the forward end of the body, said weight head having its forward side provided with a concave surface and its edge terminating coincident with the adjacent edge of the body.

4. The combination with a bait body, of means for causing said bait to dive sharply and deeply and simultaneously wobble, said means comprising a weight head carried by the forward end of the bait body and a downwardly and forwardly inclined concave surface carried by the forward side of the weight head, the side surface of said head conforming to the contour of the body side.

5. The combination with a bait body, a line attached to said bait body adjacent its forward end, of a weight head carried by said forward end of the body, said weight head being provided with a downwardly and forwardly inclined concave surface, said weight body conforming at its sides to the contour of the bait body.

6. A fish bait, comprising an elongated body having an angular face on one end, a weight member positioned on the angular face of said end having the edge terminating coincident with the adjacent edge of the body, and securing means mounted in the body and securing the weight thereon against movement.

7. A fish bait comprising an elongated body having a forward end, a weight member positioned on said forward end, said weight member having its edges terminating coincident with the adjacent edge of the body.

8. A fish bait comprising an elongated body member, a weight member positioned on one of the ends of said body member, said weight member having its edges terminating coincident with the adjacent edge of the body.

9. A fish bait comprising an elongated body, a weighted head for said body, said weighted head being secured to the body and having an angular water contacting face, and a line attaching means rearwardly of said head, whereby the greater weight will be forwardly of said attaching means.

10. A fish bait comprising an elongated body, a weighted head secured to the forward end of said body, and line attaching means carried by the body rearwardly of said head in a position whereby the greater weight of the bait as a whole will be forwardly of said attaching means.

In testimony whereof I affix my signature.

JOHN B. PAGIN.